United States Patent
Bole et al.

(10) Patent No.: US 6,523,056 B1
(45) Date of Patent: Feb. 18, 2003

(54) PROCESS FOR SECURE COMPARISON OF TWO STORAGE REGISTERS, AND SECURITY MODULE IMPLEMENTING THIS PROCESS

(75) Inventors: Benoît Bole, Versailles (FR); Jean-Luc Salles, Boulogne Billancourt (FR)

(73) Assignee: Bull CP8, Louveciennes (FR)

( * ) Notice: Subject to any disclaimer, the term of this patent is extended or adjusted under 35 U.S.C. 154(b) by 0 days.

(21) Appl. No.: 09/501,999

(22) Filed: Feb. 11, 2000

(30) Foreign Application Priority Data

Feb. 11, 1999 (FR) .............................. 99 01650

(51) Int. Cl.⁷ ............................ G06F 7/50; G06F 11/30
(52) U.S. Cl. ..................................... 708/671; 713/202
(58) Field of Search ......................... 708/671; 713/200, 713/210, 202

(56) References Cited

U.S. PATENT DOCUMENTS

| | | | |
|---|---|---|---|
| 3,771,128 A | | 11/1973 | Boardman |
| 5,097,260 A | * | 3/1992 | Ahn ..................... 340/825.56 |
| 5,226,080 A | * | 7/1993 | Cole et al. .................. 235/382 |
| 5,388,212 A | * | 2/1995 | Grube et al. ................ 379/118 |
| 5,416,306 A | * | 5/1995 | Imahata ..................... 235/380 |

FOREIGN PATENT DOCUMENTS

| | | |
|---|---|---|
| EP | 0 329 966 A | 8/1989 |
| FR | 2 311 365 A | 12/1976 |
| FR | 2471003 A | 6/1981 |

* cited by examiner

Primary Examiner—Chuong Dinh Ngo
(74) Attorney, Agent, or Firm—Edward J. Kondracki; Miles & Stockbridge p.c.

(57) ABSTRACT

The invention relates to a process for securely comparing two main storage registers, comprising defining an auxiliary storage register (A), calculating a first sum of the words composing the auxiliary storage register, comparing the words of the two main storage registers, randomly selecting one of the words of the auxiliary storage register, and modifying the value of the selected word by a first predetermined value if said words of the main storage registers are identical, and modifying the value of said selected word by a second predetermined value if said words of the main storage registers are different, calculating a second sum ($S_{A2}$) of the words of the auxiliary storage register, and modifying the second sum by a value equal to said first value multiplied by the number of words (n) of the main storage registers, and comparing said first and second sums ($S_{A1}$, $S_{A2}$). The invention also relates to the associated security module.

7 Claims, 4 Drawing Sheets

US 6,523,056 B1

PROCESS FOR SECURE COMPARISON OF TWO STORAGE REGISTERS, AND SECURITY MODULE IMPLEMENTING THIS PROCESS

FIELD OF THE INVENTION

The invention relates to a process for the secure comparison of two storage registers, and a security module implementing this process.

DESCRIPTION OF RELATED ART

The term "security module" should be understood either in its conventional sense, in which it designates a device whose purpose in a communication or information network is to be held by an authority supervising the network and to store, in protected fashion, secret and fundamental parameters of the network such as cryptographic keys, or more simply, as designating a device allocated to various users of the network that allows each of them to have access to the latter, this latter device also being capable of holding secret parameters. The security module could take the form of a portable object of the chip card type.

It is known that a hacker is capable of deducing certain information on the operations performed in a security module by carefully studying the electric current consumption of the security module. In particular, when it comes to the operation for comparing two storage registers, the hacker can try to study the evolution of this electric current and attempt to deduce from it the positive or negative result of this comparison.

In the known art, the operation for comparing two storage registers, which is done by comparing two by two various words composing the registers, includes an operation for writing the result of each comparison performed between words: this write operation consists in a setting to 0 or to 1 of a bit in an auxiliary register, as a function of the result of the comparison. This direct translation of the result into a setting to 0 or to 1 of a bit is susceptible to being discovered by a hacker.

SUMMARY OF THE INVENTION

The object of the invention is to offer a process for comparing two storage registers that does not involve a direct writing of the result of the comparison into an auxiliary register. To this end, the invention relates to a process for comparing two main storage registers, these registers comprising the same number of words, each having a value defined by several logical elements, characterized in that it comprises the steps consisting of:

defining at least one auxiliary storage register comprising several words each having a value defined by several logical elements;

setting the logical elements of the auxiliary storage register to random values;

calculating a first sum of the values of the words of the auxiliary storage register;

comparing two by two the respective words of the main storage registers, and for each comparison of two respective words, randomly selecting one of the words of the auxiliary storage register, and modifying the value of this word by a first predetermined value if said words of the main storage registers are identical, and modifying the value of this word by a second predetermined value if said words of the main storage registers are different;

calculating a second sum of the values of the words of the auxiliary storage register, and modifying it by a value equal to said first value multiplied by the number of words of the main storage registers; and comparing said first and second sums, and in the event of equality, declaring that said main storage registers are identical, while in the event of inequality, declaring that said main storage registers are different.

BRIEF DESCRIPTION OF THE DRAWINGS

Other details and advantages of the present invention will emerge from the following description of a preferred but non-limiting embodiment, in reference to the attached drawings in which.

DESCRIPTION OF THE PREFERENCE EMBODIMENTS

Figure 1:
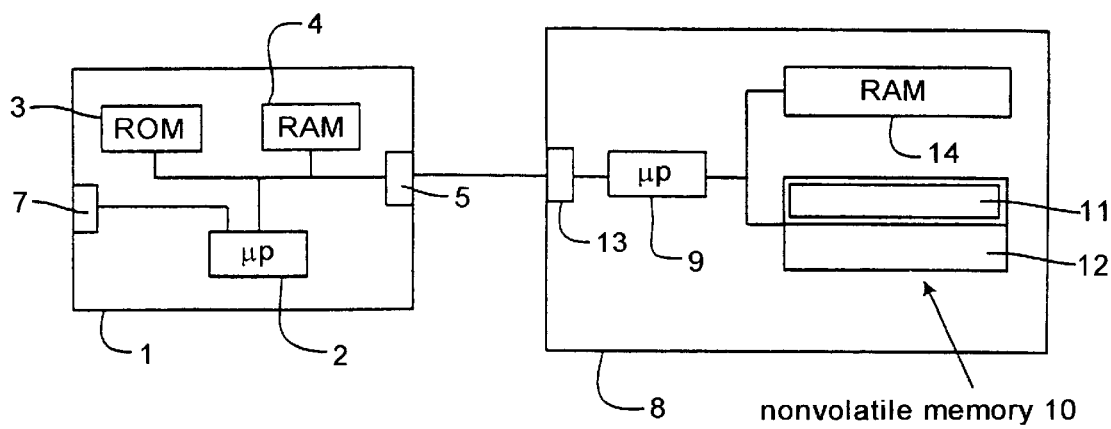
FIG. 1 represents a data processing device that cooperates with a security module.

FIG. 1 represents a data processing device 1 cooperating with a security module in the form of a portable object 8. The data processing device comprises, in a way that is known per se, a microprocessor 2 to which are connected a memory ROM 3 and a memory RAM 4, means 5 for cooperating, with or without physical contact, with the portable object 8, and a transmission interface 7 that allows the data processing device to communicate with a data communication network. The data processing device 1 can also be equipped with storage means such as diskettes or disks that may or may not be removable, entry means (such as a keyboard and/or a pointing device of the mouse type) and display means, these various means not being represented in FIG. 1.

The data processing device can be constituted by any computing device installed at a private or public site and capable of providing means for managing information or delivering various goods or services, this device being permanently installed or portable. It can also be a device dedicated to telecommunications.

In addition, the portable object 8 carries a chip that includes information processing means 9, a nonvolatile memory 10, a volatile working memory RAM 14, and means 13 for cooperating with the data processing device 1. This chip is laid out so as to define, in the LS memory 10, a secret area 11 in which information, once recorded, is inaccessible from outside the chip and only accessible to the processing means 9, and an accessible area 12 that is made accessible from outside the chip through the microprocessor 9 for reading and/or writing information. Each area of the nonvolatile memory 10 can comprise a part that is not modifiable ROM and a part that is modifiable EPROM, EEPROM or constituted by a RAM of the "flash" type or a FRAM (the latter being a ferromagnetic RAM), i.e, having the characteristics of an EEPROM but with access times identical to those of a conventional RAM.

For the chip, it is possible to use a self-programmable microprocessor with a nonvolatile memory, as described in U.S. Pat. No. 4.382.279 in the name of the Applicant. As indicated in column 1, lines 13–25 of this patent, the self-programmable feature of the chip corresponds to the capability for a program fi located in a ROM to change another program fj located in a programmable memory into a program gj. In a variant, the microprocessor of the chip is replaced—or at least supplemented—by logic circuits installed in a semiconductor chip. In essence, such circuits are capable of performing calculations, particularly authentication and signature calculations, as a result of their hardwired, rather than microprogrammed, logic. They can particularly be of the ASIC ("Application Specific Integrated Circuit") type. Advantageously, the chip will be designed in monolithic form.

Figure 2:
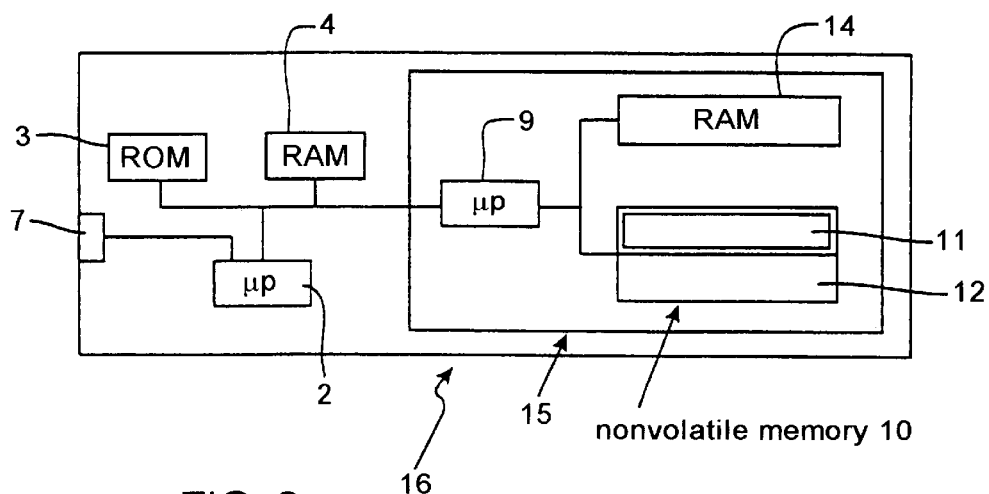
FIG. 2 represents a variant of FIG. 1.

A variant of FIG. 1 is illustrated in FIG. 2, in which the data processing device 16 comprises, in addition to the elements of the data processing device 1 of FIG. 1, those of the portable object 8 disposed in a security module 15, the elements common to both FIGS. 1 and 2 having the same references. However, the cooperation means 5, 13 of FIG. 1 are replaced by a permanent link between the microprocessor 2 and the microprocessor 9.

According to a variant of FIG. 2, the data processing device is constituted by the security module 15 of FIG. 2 itself.

Figure 3:
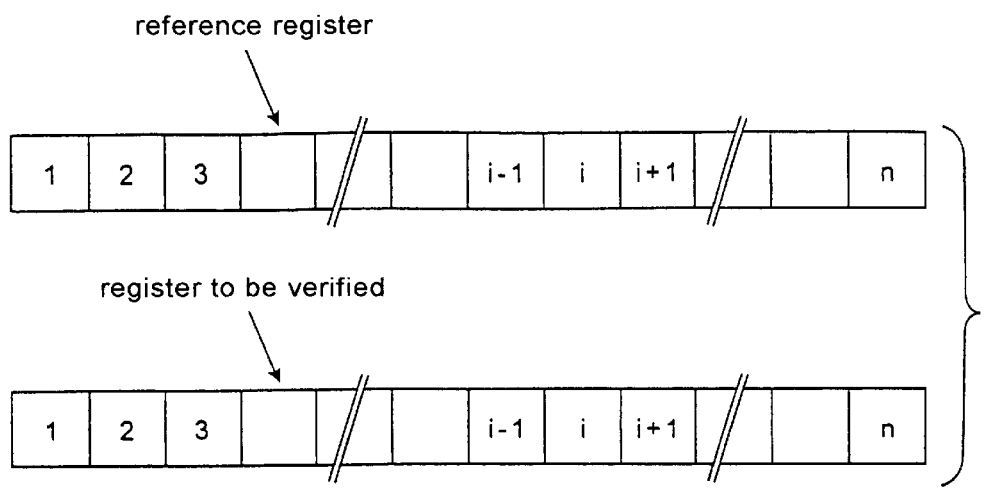
FIG. 3 represents two main registers to be compared.

FIG. 3 represents two main storage registers of the volatile memory RAM 14 of the above-mentioned security module, each comprising the same number of n words constituted by (typically eight) bytes, marked (1, 2, . . . , i, . . . n). One of the two registers is a reference register that temporarily stores a reference value such as, for example, a user code or PIN (Personal Identification Number) or a signature or any other readable quantity, saved in nonvolatile memory 10 and making it possible to perform an authentication. As for the other register, it is a register to be verified by comparison with the reference register; it contains a quantity generally received from outside the security module.

Figure 4:
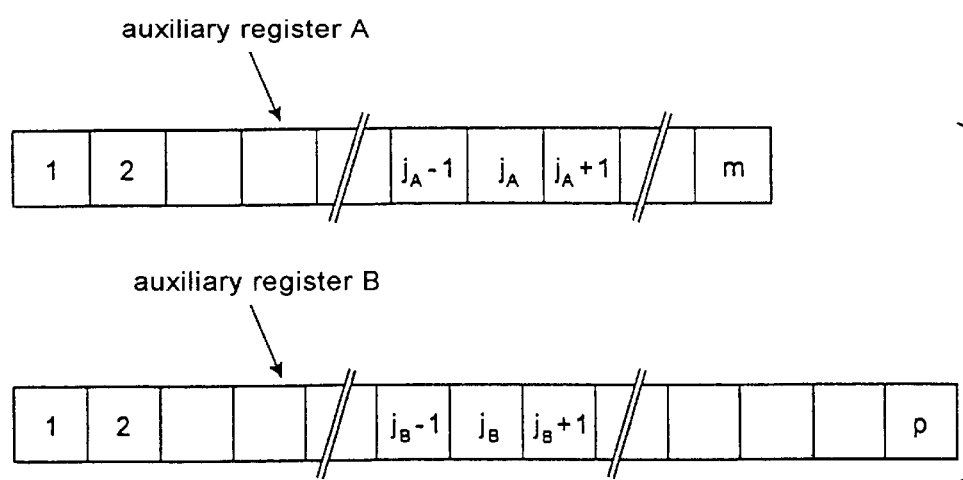
FIG. 4 represents two auxiliary registers A and B used to compare the main registers.

The volatile memory RAM 14 also contains (FIG. 4) two auxiliary registers A, B, each comprising a certain number of bytes (typically the same number as for the main registers), marked (1, 2, . . . , $j_A$, . . . , ) and (1, 2, . . ., $j_B$ . . . p). These registers will be used to record the result of the comparison between the main storage registers, as explained in reference to FIG. 6.

Figure 5:
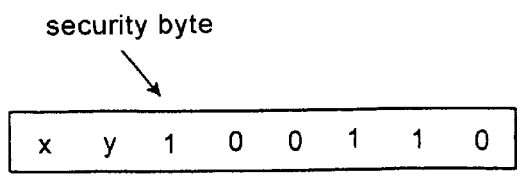
FIG. 5 represents a security byte used for comparing the main registers.

The volatile memory RAM 14 also contains (FIG. 5) a security byte comprising two significant bits x and y. The value of the bit x defines, as explained in reference to FIG. 6, one of two ways of translating an equality between the two main storage registers. The value of the bit y defines which of the two auxiliary registers A and B will actually be used to obtain the result of the comparison between the main storage registers.

The process for comparing the reference register and the register to be verified will now be explained in reference to FIG. 6. First of all, the security byte is generated randomly using a known random number generator provided in the hardware or software of the security module (step 61). The two auxiliary registers A and B are also generated randomly (step 62). Next, a first sum $S_{A1}$ of all the bytes of the auxiliary register A and a first sum $S_{B1}$ of all the bytes of the auxiliary register B are calculated (step 63). An index i defining the position of a current byte of the reference register or of the register to be verified is set to 0 (step 64), then 1 is added to this 5 index (step 65). i is then compared to the total number n of bytes of these registers (step 66): if i is not greater than n, two indices $j_A$ and $j_B$ are generated (step 67), $j_A$ being between 1 and m and $j_B$ being between 1 and p, respectively corresponding to the position of a current byte of the auxiliary register A and to the position of a current byte of the auxiliary register B.

The two bytes in the i position of the reference register and of the register to be verified are then compared (step 68). Then, the value of the bit x of the security byte is determined (step 69). Let us first consider the case where x is different from 1, i.e., has the value 0. In step 70, it is first determined whether there is equality between the two bytes in position i. If not (step 72), the byte with the index $j_A$ of the auxiliary register A is incremented by one unit and the byte with the index $j_B$ of the register B is decremented by one unit. If so (step 71), the inverse operations are performed, i.e., the byte with the index $j_A$ of the auxiliary register A is decremented by one unit and the byte with the index $j_B$ of the auxiliary register B is incremented by one unit.

On the other hand, if in step 69, x equals 1, the inverse operations of those performed when x equals 0 are performed. In step 73, it is determined whether there is equality between the two bytes in position i. If not (step 75), the byte with the index $j_A$ of the auxiliary register A is decremented by one unit and the byte with the index $j_B$ of the auxiliary register B is incremented by one unit. If so (step 74), the inverse operations are performed, i.e. the byte with the index $j_A$ of the auxiliary register A is incremented by one unit and the byte with the index $j_B$ of the register B is decremented by one unit.

At the end of any of the four steps 71, 72, 74, 75, the process returns to step 65 to increase the index i by one unit; this is followed by a comparison of next two bytes of the reference register and of the register to be verified. Once all the bytes of these two registers have been compared, i becomes greater than n in step 66, which ends the procedure.

Figure 6:
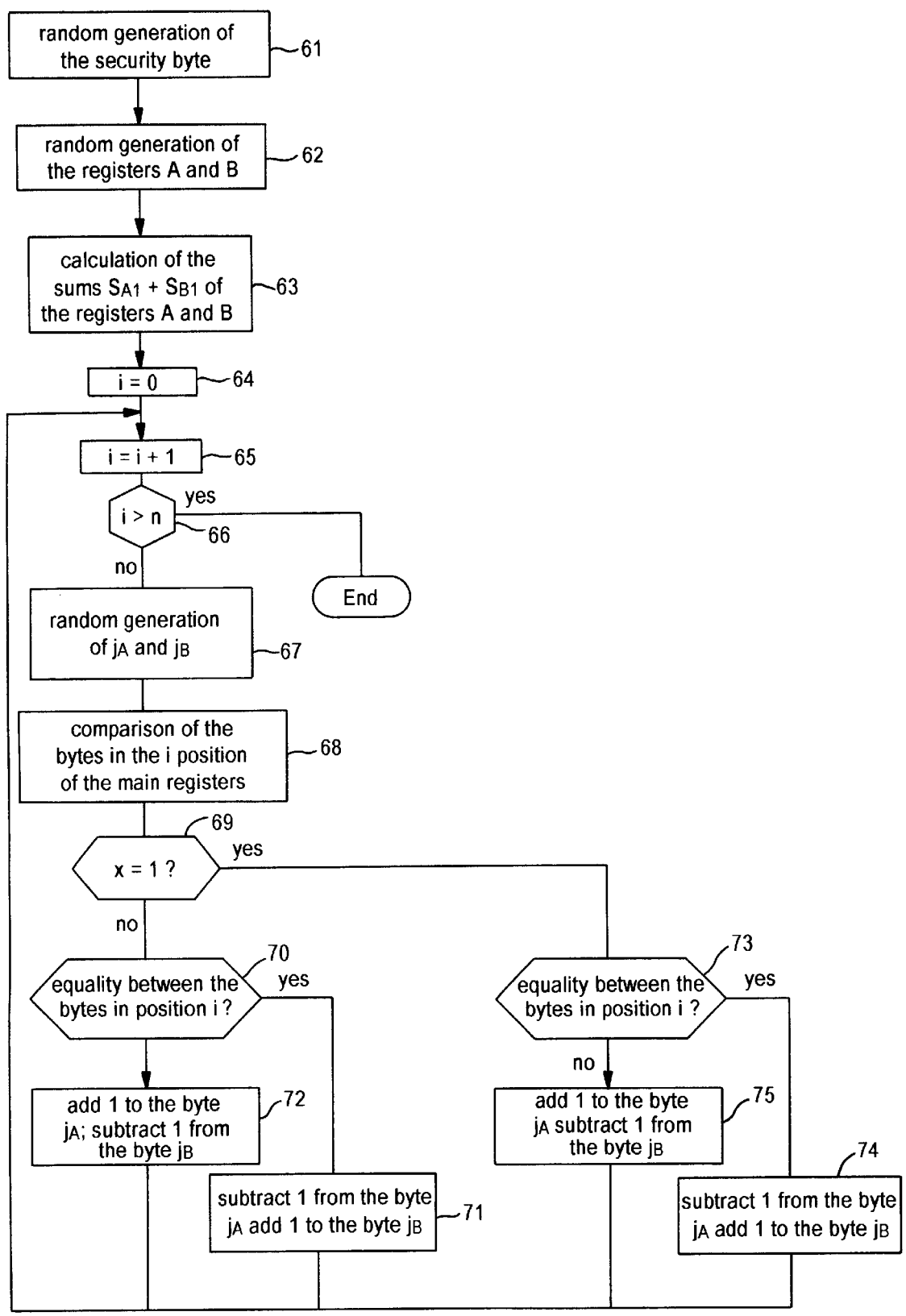
FIG. 6 is a flow chart of the procedure for comparing the main storage registers and accordingly writing into the auxiliary registers A and B.
Figure 7:
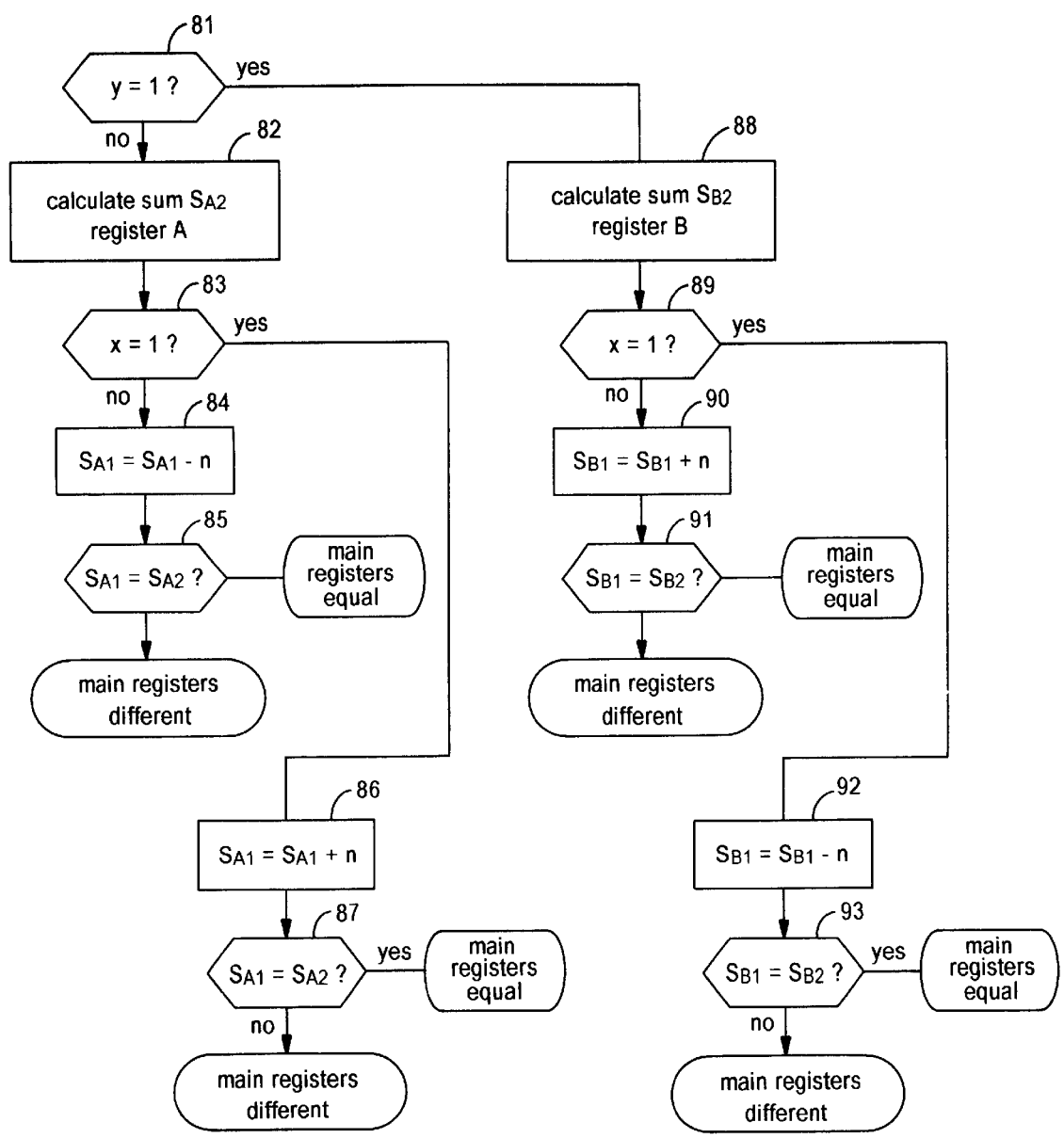
FIG. 7 is a flow chart of the procedure for analyzing the result of the comparison of the main registers by means of the auxiliary registers A and B.

The way in which the results obtained in FIG. 6 are used will be explained in reference to FIG. 7. First, the value of the bit y of the security byte is determined (step 81). If y is different from 1, the auxiliary register A will be used to find the result of the comparison between the two main registers, and the auxiliary register B will be ignored. To do this, the sum of the bytes of the auxiliary register A is again calculated (step 82), which gives a second sum $S_{A2}$. Then, the value of the bit x of the security bit is determined (step 83). If x is different from 1, the value n is subtracted from the first sum $S_{A1}$ of the bytes of the auxiliary register A (step 84), i.e. this sum is modified by the value (−n). This value (−n) is obtained by multiplying by the number n of bytes of the reference register the value by which the byte $j_A$ of the auxiliary register A was previously modified (see FIG. 6, step 71), or in this case (−1)x n=(−n). Lastly, in step 85, the first and second sums $S_{A1}$ and $S_{A2}$ of the auxiliary register A are compared: an equality between these 10 sums indicates equality between the reference register and the register to be verified, while a difference between these two sums means that the reference register and the register to be verified are different.

If, in step 83, x equals 1, the value n is added to the first sum $S_{A1}$ of the bytes of the auxiliary register A (step 86), i.e., this sum is modified by the value (+n). This value (+n) is obtained by multiplying by the number n of bytes of the reference register the value by which the byte $j_A$ of the auxiliary register A was previously modified (see FIG. 6, step 74), or in this case (+1) x n=(+n). Lastly, in step 87, the first and second sums SA, and $S_{A2}$ of the auxiliary register A are compared: an equality between these sums indicates equality between the reference register and the register to be verified, while a difference between these sums means that the reference register and the register to be verified are different.

On the other hand, if in step 81, y is equal to 1, the auxiliary register B will be used to find the result of the comparison between the two main registers, and the auxiliary register A will be ignored. To do this, the sum of the bytes of the auxiliary register B is again calculated (step 88), which gives a second sum $S_{B2}$. The value of the bit x of the security byte is then determined (step 89). If x is different from 1, the value n is added to the first sum $S_{B1}$ of the bytes of the auxiliary register B (step 90). Lastly, in step 91, the first and second sums $S_{B1}$ and $S_{B2}$ of the auxiliary register B are compared: an equality between these sums indicates equality between the reference register and the register to be verified, while a difference between these sums means that the reference register and the register to be verified are different.

If, in step 89, x equals 1, the value n is subtracted from the first sum $S_{B1}$ of the bytes of the auxiliary register B (step 92). Lastly, in step 93, the first and second sums $S_{B1}$ and $S_{B2}$ of the auxiliary register B are compared: an equality between these sums indicates equality between the reference register and the register to be verified, while a difference between these sums means that the reference register and the register to be verified are different.

It is clear that the utilization of two auxiliary registers A and B advantageously makes it possible to generate the same number of incrementations and decrementations, which does not provide any information to a potential hacker. It is also clear that the number of bytes manipulated during the process is a priori different for the auxiliary register A and the auxiliary register B, since the same byte may be manipulated several times.

In a variant of the process described above, only one auxiliary register is used: in this case, this auxiliary register is inevitably used during the operation on the results.

According to another variant of the process described above, the bytes of the auxiliary registers A and B are modified during steps 72, 75, by a value different from one unit; however, it is necessary to avoid the value 0, which does not modify the byte in question, thus causing a behavioral dissymmetry when compared to a value different from 0. Furthermore, the two modifications in the auxiliary registers A and B could be made in the same direction but using a different value (whereas in FIG. 6, these changes are made in opposite directions).

According to another variant of the process described above, prior to each of the steps 71, 72, 74, 75 for modifying the auxiliary registers A and B, a random selection is made to determine which of these two registers will be modified first.

In the above, the registers used are located in the memory RAM 14 of the security module. In a variant, they could be located in the nonvolatile memory 10.

In the above, the words of the reference register and of the register to be verified comprise several logical elements (eight bits); in a variant, this number could be reduced to one.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein and defined in the claims.

What is claimed is:

1. A process for comparing two main storage registers, said registers comprising an equal number of words, each word having a value defined by at least one logical element, characterized in that it comprises the steps of:

defining at least one auxiliary storage register (A) comprising several words, each word having a value defined by several logical elements;

setting the logical elements of the auxiliary storage register (A) to random values;

calculating a first sum ($S_{A1}$) of the values of the words of the auxiliary storage register;

comparing the respective words (i) of the main storage registers two by two, for each comparison of two respective words of the main storage register randomly selecting one of the words of the auxiliary storage register, modifying the value of randomly selected word by a first predetermined value if said words of the main storage registers are identical, and modifying the value of said randomly selected word by a second predetermined value if said words of the main storage registers are different;

calculating a second sum ($S_{A2}$) of the values of the words of the auxiliary storage register, modifying the second sum by a value equal to said first value multiplied by the number of words (n) of the main storage registers;

comparing said first and second sums ($S_{A1}$, $S_{A2}$), and in the event of an equality, declaring that said main storage registers are identical, and, in the event of an inequality, declaring that said main storage registers are different.

2. A process according to claim 1, further comprising randomly assigning one of said first and second predetermined values to an identity between the words of the main storage registers, and assigning the other of said first and second predetermined values to a difference between the words of the main storage registers, modifying said second sum ($S_{A2}$) of the values the words of the auxiliary storage register (A) by a value equal to said one of said first and second predetermined values, multiplied by the number of words (n) of the main storage registers.

3. A process according to claim 1 using a first and a second auxiliary register (A, B) further comprising the steps of:

setting the logical elements of the auxiliary storage registers to random values;

calculating a first sum ($S_{A1}$, $S_{B1}$) of the values of the words of the auxiliary storage registers;

comparing the respective words of the main storage registers two by two, and for each comparison of two respective words, randomly selecting one of the words of the first auxiliary storage register, modifying the value of the selected word by a first predetermined value if said words of the main storage registers are identical, and modifying the value of said selected word by a second predetermined value if said words of the main storage registers are different, randomly selecting one of the words of the second auxiliary storage register and modifying the value of said randomly selected word by a third predetermined value if said words of the main storage registers are identical, and modifying the value of said randomly selected word by a fourth predetermined value if said words of the main storage registers are different;

randomly selecting one of the two auxiliary storage registers, and, in the case of the first auxiliary storage register, calculating a second sum ($S_{A2}$) of the values of the words of the first auxiliary storage request, and modifying the second sum ($S_{A2}$) by a value equal to said first value multiplied by the number of words of the main storage registers, and in the case of the second auxiliary storage register, calculating a second sum ($S_{B2}$) of the values of the words of the second auxiliary storage register, and modifying the second sum ($S_{B2}$) by a value equal to said third value multiplied by the number of words of the main storage registers; and comparing said first and second sums of the auxiliary storage register selected, and in the event of an equality, declaring that said main storage registers are identical, and, in the event of an inequality, declaring that said main storage registers are different.

4. A process according to claim 3, wherein the step for modifying the words of the auxiliary storage registers (A,B) consists of randomly selecting one of the words of the first auxiliary storage register and modifying the value of said randomly selected word by a value in a first direction if said words of the main storage registers are identical, and modifying the value of said randomly selected word by the same value in a second direction opposite from the first direction if said words of the main storage registers are different, then randomly selecting one of the words of the second auxiliary storage register and modifying the value of randomly selected word by said value in the second direction if said words of the main storage registers are identical, and modifying the value of said randomly selected word by the same value in the first direction if said words of the main storage registers are different.

5. A process according to claim 3, wherein for the first auxiliary storage register (A), one of said first and second predetermined values is randomly assigned to an identity between the words of the main storage registers, and the other of said first and second predetermined values is assigned to a difference between the words of the main storage registers, and further including modifying said second sum ($S_{A2}$) of the values of the words of the first auxiliary storage register by a value equal to said one of said first and second predetermined values, multiplied by the number of words (n) of the main storage registers, and for the second auxiliary storage register (B), randomly assigning one of said third and fourth predetermined values to an identity between the words of the main storage registers, and assigning the other of aid third and fourth predetermined values to a difference between the words of the main storage registers, and modifying said second sum ($S_{B2}$) of the values of the words of the second auxiliary storage register by a value equal to said one of said third and fourth predetermined values, multiplied by the number of words of the main storage registers.

6. A process according to claim 3, wherein the step for modifying the words of the auxiliary registers (A, B) is preceded by a step for randomly selecting one of the two auxiliary registers whose words will be modified first.

7. A security module comprising information processing means (9) and information storage means (10, 14), said storage means comprising at least two main storage registers, said registers comprising the same number (n) of words, each having a value defined by at least one logical element, means for defining at least one auxiliary storage register (A) comprising several words, each having a value defined by several logical elements;

means for setting the logical elements of the auxiliary storage register to random values;

means for calculating a first sum ($S_{A1}$) of the values of the words of the auxiliary storage register;

means for comparing the respective words (i) of the main storage registers two by two, and, for each comparison of two respective words, randomly selecting one of the words of the auxiliary storage register and modifying the value of said selected word by a first predetermined value if said words of the main storage registers are identical, and modifying the value of said selected word by a second predetermined value if said words of the main storage registers are different;

means for calculating a second sum ($S_{A2}$) of the values of the words of the auxiliary storage register, and modifying said second sum ($S_{A2}$) by a value equal to said first value multiplied by the number of words of the main storage registers; and means for comparing said first and second sums ($S_{A1}$, $S_{A2}$) and in the event of equality, declaring that said main storage registers are identical, and, in the event of inequality, declaring that said main storage registers are different.

* * * * *